United States Patent [19]
Coombs et al.

[11] Patent Number: 5,214,530
[45] Date of Patent: May 25, 1993

[54] OPTICALLY VARIABLE INTERFERENCE DEVICE WITH PEAK SUPPRESSION AND METHOD

[75] Inventors: Paul G. Coombs; Roger W. Phillips, both of Santa Rosa, Calif.

[73] Assignee: Flex Products, Inc., Calif.

[21] Appl. No.: 799,862

[22] Filed: Nov. 27, 1991

Related U.S. Application Data

[63] Continuation of Ser. No. 568,419, Aug. 16, 1990, abandoned.

[51] Int. Cl.$^5$ .............................................. G02B 5/28
[52] U.S. Cl. ........................................ 359/359; 283/91; 359/360; 359/585; 359/589
[58] Field of Search ............... 350/1.6, 1.7, 164, 166; 356/2; 283/87, 91, 94; 359/359, 360, 361, 584, 585, 587, 589, 590

[56] References Cited

U.S. PATENT DOCUMENTS

| | | | |
|---|---|---|---|
| 4,048,039 | 9/1977 | Daxinger | 350/166 |
| 4,065,626 | 12/1977 | Franz | 350/166 |
| 4,101,200 | 7/1978 | Daxinger | 350/166 |
| 4,408,825 | 10/1983 | Stelmack | 350/166 |
| 4,705,300 | 11/1987 | Berning et al. | 356/2 |
| 4,705,356 | 11/1987 | Berning et al. | 350/166 |
| 4,735,488 | 4/1988 | Rancourt et al. | 350/164 |
| 4,779,898 | 10/1988 | Berning et al. | 283/91 |
| 4,838,648 | 6/1989 | Phillips et al. | 283/91 |
| 4,846,551 | 7/1989 | Rancourt et al. | 350/166 |
| 4,856,857 | 8/1989 | Takeuchi et al. | 350/3.6 |
| 4,930,866 | 6/1990 | Berning et al. | 350/166 |

*Primary Examiner*—Martin Lerner
*Attorney, Agent, or Firm*—Flehr, Hohbach, Test, Albritton & Herbert

[57] ABSTRACT

Optical variable interference device with peak suppression having a reflector with first and second surfaces. A thin film multilayer interference stack is disposed on the first surface. The interference stack is comprised of at least two periods with each period being comprised of a metal absorber layer and a dielectric spacer layer.

31 Claims, 6 Drawing Sheets

OPTICALLY VARIABLE INTERFERENCE DEVICE WITH PEAK SUPPRESSION AND METHOD

This is a continuation, of application Ser. No. 07/568,419 filed Aug. 16, 1990 now abandoned.

This invention relates to an optically variable interference device having peak suppression and a method.

In U.S. Pat. Nos. 4,705,300; 4,705,356 and 4,779,898 there are disclosed thin film optically variable articles and a method for which provides a limited range of optically shifting colors in the interference designs. These colors are based on an interference phenomenon which resulted by tilting the thin film coating to change the effective light interference path. These designs in combination with blocking dyes have made it possible to achieve additional colors by subtracting a color or modifying a color or blocking colors at high angles. Such approaches, however, provide only a limited range of optically shifting colors. There is a need for additional colors which can be utilized in optically variable interference devices or optical shifters of a thin film design.

In general it is an object of the present invention to provide an optically variable interference device and a method in which additional colors can be provided.

Another object of the invention is to provide a device and method of the above character in which peak suppression is utilized.

Another object of the invention is to provide a device and method of the above character in which two or more periods are utilized.

Another object of the invention is to provide a device and method of the above character in which at least one color is suppressed.

Another object of the invention is to provide a device and method of the above character in which multiple colors are suppressed.

Another object of the invention is to provide a device and method of the above character which provides a higher color saturation and purity.

Another object of the invention is to provide a device and method of the above character in which a wide suppression range is utilized.

Another object of the invention is to provide a device and method of the above character in which there is suppression in the infrared.

Additional objects and features of the invention will appear from the following description of the preferred embodiments as set forth in detail in conjunction with the accompanying drawings.

In general, the optically variably interference device having peak suppression is comprised of a substrate having first and second surfaces. A thin film multilayer interference coating is disposed on the first surface. The interference coating is comprised of a metal reflector layer having a surface and at least two periods formed on the surface of the metal reflector layer with each period being comprised of a metal absorber layer and a spacer dielectric layer. The reflector interacts with the at least two periods of the interference coating to cause peak suppression at all angles in the design due to interference effects in the design by itself of at least two periods.

Figure 1:
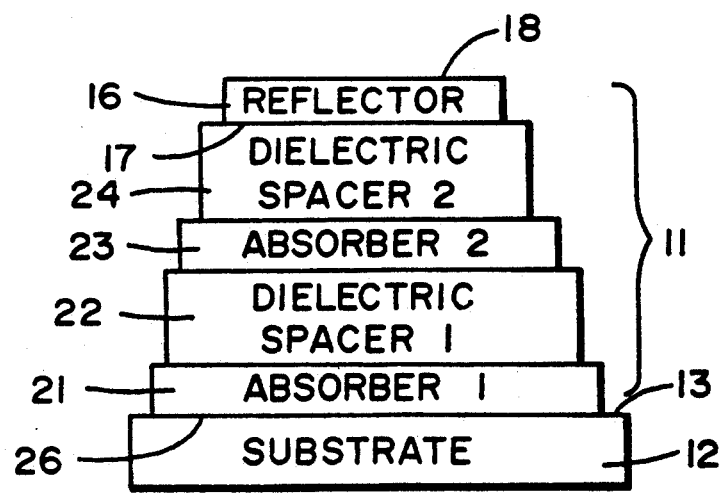
FIG. 1 is a cross-sectional view showing an asymmetric design of an optically variable interference device with periodic peak suppression incorporating the present invention.

As more particularly shown in FIG. 1 of the drawings, the optically variable interference device 11 of the present invention is disposed on a substrate 12. The substrate 12 can be formed of any suitable material such as a flexible web, formed of a suitable plastic such as PET and of a suitable thickness as for example ranging from two to seven mils. The optical variable interference of device 11 is in the form of a multilayer thin film stack which is comprised of a reflector layer 16 having surfaces 17 and 18 with at least two periods being disposed on one of the surfaces as for example surface 17 to provide an asymmetric device. Each of the periods is formed of a metal absorber layer and a spacer dielectric layer. In order to form the thin film interference stack 11 on the substrate to provide the asymmetric optical variable interference device 11, the thin film layers forming the periods are deposited in reverse order upon the surface 13 of the substrate 12. Thus absorber layer 1 is first deposited on the surface 13 of the substrate 12 and is followed by a dielectric spatial layer 1 identified as 22 to provide the first period and this is followed by an absorber layer 2 identified as layer 23 and a dielectric spacer layer 2 identified as 24 for the second period, after which there is deposited thereon the reflector layer 16. Thus, it can be seen that a two period interference stack is provided with two dielectric spacers and two absorbers in alternating order.

It has been found to achieve the best color in a two period multilayer interference stack, the outer absorber layer 1 should be between one third and one half the thickness of the innermost absorber layer. For best results it has been found that absorber layers should be made of a grey metal such as chrome, nickel, palladium, etc. The desired characteristics of the grey metal are described in U.S. Pat. No. 4,705,356.

The reflector layer 16 should be made of a highly reflective material such as silver or aluminum. However, lower reflecting materials such as chromium, nickel and palladium can be used. Even copper and gold can be utilized, however, they are not as desirable because they are highly dispersive and have less reflectance at the blue end of the spectrum and thus tend to distort color and to limit the ability to suppress peaks as hereinafter described in accordance with the present invention. The reflector layer 16 should be thick enough so that it is substantially opaque. For example, for aluminum this means that the aluminum should be approximately 400 Angstroms thick but can range in thickness to 1,000 Angstroms if desired. However, the increased thickness does not add to the performance of the interference device and only serves to increase the cost. It should be appreciated that there are applications of the present invention in which a semi-tansparent reflective layer 16 can be provided.

In order to permit separation of the optically variably interference device 11 from the substrate 12, it may be desirable to deposit a release coat upon the surface 13 prior to deposition of the layers forming the dielectric stack onto the substrate 12. The multilayer interference stack 11 can be deposited in the conventional manner by the use of a conventional vacuum chamber. Thus, absorber layer 21 is first deposited on the surface 13 and is formed of a suitable grey metal such as chromium with a thickness range from 20 to 150 angstroms and typically about 35 angstroms. The dielectric or spacer layer 22 is deposited on the absorber layer 21 at two quarter waves of optical thickness at a design wavelength range of 400 nanometers to 1500 nanometers depending on the color desired. This spacer layer is formed of a suitable low index material such as magnesium fluoride ($MgF_2$) or silicon oxide ($SiO_2$) where the index refraction N is less than or equal to 1.65 for effective results. The absorber layer 23 is then deposited to a thickness of approximately 100 angstroms and of the same material as absorber layer 21. This is followed by spacer layer 24 which is formed to the same thickness and of the same material as spacer layer 22. After the two periods have been deposited, the reflector layer 16 is deposited on the dielectric spacer layer 24 to a thickness which is substantially opaque as hereinbefore described.

Although only two periods have been shown for the multilayer interference stack, additional periods can be formed of the same material and thicknesses as the periods hereinbefore described to achieve different results as can be seen from the graphs set forth in FIGS. 3–10.

Because the optical and variable interference device 11 shown in FIG. 1 is asymmetric, it is most useful when only one surface of the device is to be viewed. This is true in many applications as, for example, hot stamp foil applications. Such use as a suitable adhesive is applied to the surface 18 of the reflector layer 16 in the device transferred to a new surface and in so doing exposing 26 of the absorber layer 21 when the multilayer interference stack 11 is separated from the substrate 12. This makes the optically variable stacks visible from the direction of the surface 26.

Figure 2:
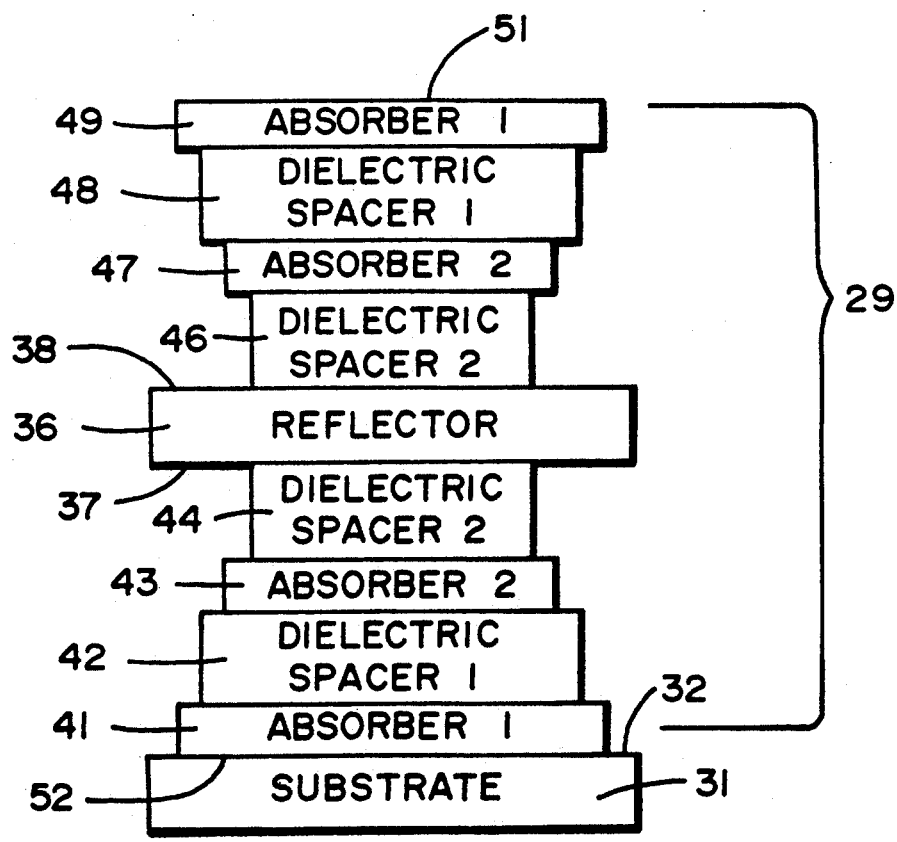
FIG. 2 is a cross-sectional view showing a symmetric design of an optically variable interference device with periodic peak suppression incorporating the present invention.

Although an asymmetric device has been shown in FIG. 1, it should be appreciate that symmetrical devices can be readily prepared as shown in FIG. 2. Such symmetrical designs are particularly desirable when the thin film multilayer interference device is broken into flakes which are incorporated into pigments. In such an application it is particularly desirable to have a multilayer interference coating on each side of the reflector. A symmetric optically variable interference device 29 is shown in FIG. 2 and is disposed on a substrate 31 having a surface 32. The substrate 31 can be of the same type as substrate 12. The optically variably interference device 29 is comprised of reflector 36 having surfaces 37 and 38 in which asymmetrical multilayer interference stacks are provided on both surfaces 37 and 38 with each stack being comprised of at least two periods with each period being comprised of a metal absorber layer and a dielectric spacer layer. In order to facilitate fabrication of the optical variable interference device 29, it can be formed in a conventional manner in a conventional vacuum chamber. As described in connection with FIG. 1, the surface 32 of the substrate 31 can be provided with a release layer to facilitate separation of the optically variable device from substrate 31.

The optical variable device as shown in FIG. 1 when viewed from the direction of the substrate 12, the device would appear colored assuming that the substrate 12 is clear and substantially uncolored. However, when reviewed from the direction of the surface 26, the device would have the uniform reflection of the reflector layer 16 and would have no color.

The absorber layer 41 would be first deposited on the surface 32 followed by the dielectric spacer layer 42, the absorber layer 43 and the spacer layer 44. Thereafter, the reflector layer 36 is deposited on the dielectric spacer layer 44. The reflector layer is followed by the dielectrical spacer layer 46, the absorber layer 47, a dielectrical spacer layer 48 and an absorber layer 49 to provide an optical variable interference device in which two period metal dielectric stacks are provided on the opposite surfaces 37 and 38 of reflector layer 36 to provide surfaces 51 on the absorber layer 49 and surface layer 52 on the absorber layer 41. As pointed out previously, although only two periods have been shown for the multilayer interference stack provided on each side of the reflector 36, additional periods can be provided if desired. The absorber layers and the dielectric spatial layers can be formed of the same material and thicknesses as described for the optical variable interference device 11 as shown in FIG. 1. By depositing the layers in the manner shown in FIG. 2 it can be seen that when the device 29 is separated from the substrate 31 the device 29 can be broken apart and formed into flakes which are symmetrical with the layers on each side of the reflector 36 being formed of the same materials and the same thickness to provide the same interference stacks for coating on both sides of the opaque reflector 36.

By way of example in accordance with the present design as hereinafter explained, a red-to-green optically variable interference device or shifter 11 or 29 can be provided by utilizing dielectric layers or spacers having a thickness of two quarter waves at a design wavelength such as approximately 595 nanometers. For a grey-to-red device or shifter 11 or 29, the dielectric layers have a thickness of two quarterwaves at 750 nanometers. For a blue-to-red device or shifter, the dielectric layers have a thickness of two quarter waves at approximately 800 to 850 nanometers.

Figure 3:
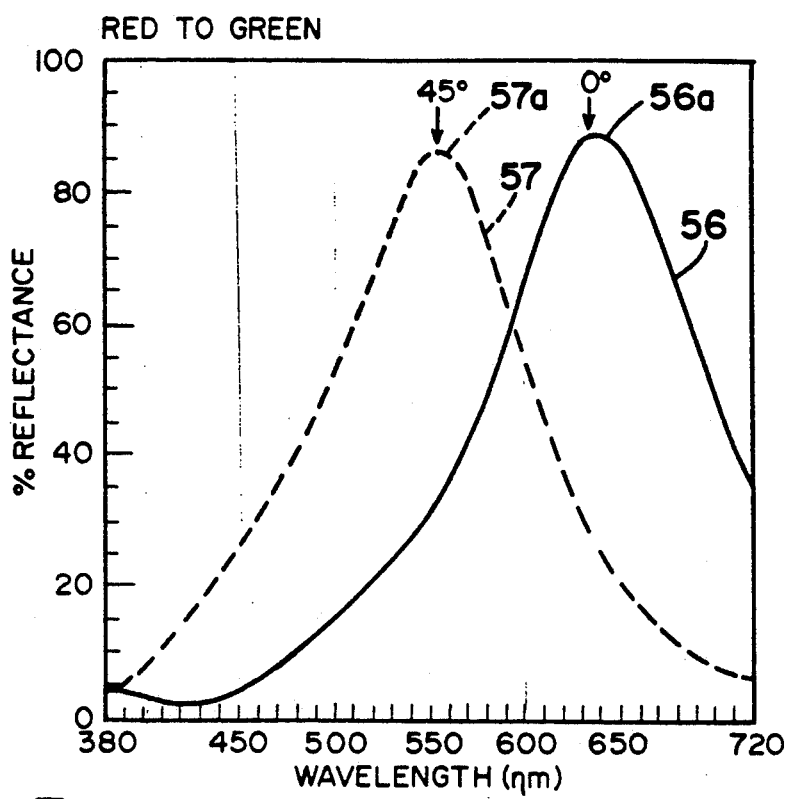
FIG. 3 is a graph showing a red to green optical variable interference device.

In FIG. 3 there is shown a graph which shows new colors which can be achieved with the new optically variable interference device incorporating the present invention. A red-to-green color shift is shown in FIG. 3 in which the curve 56 represents the two-period design of FIG. 1 at a viewing angle of 0° to provide a red color and in which the dashed-line curve 57 viewed at 45° to provide a green color. As can be seen very intense reflectance peaks are obtained at 56a and 57a. This approaches 90% reflectance when using aluminum for the reflector layer 16 or 36. The graph of FIG. 3 also shows that there is no reflectance peak in the blue region which is the 400 to 450 nanometer region. Thus, the graph in FIG. 2 shows there has been a suppression of the blue color. Without the additional period, a single period design provides a magenta-to-green color shift is provided rather than a red-to-green color shift provided by a two-period design.

Although the curves shown in FIG. 3 represent computer-generated data, it has been found that there is a high degree of correspondence between the computer-generated curves and the curves obtained from actual foils and pigments made in accordance with the present invention. Thus there are provided very saturated high reflective peaks with low reflectance in between to indicate suppression of the in between color peaks.

Figure 4:
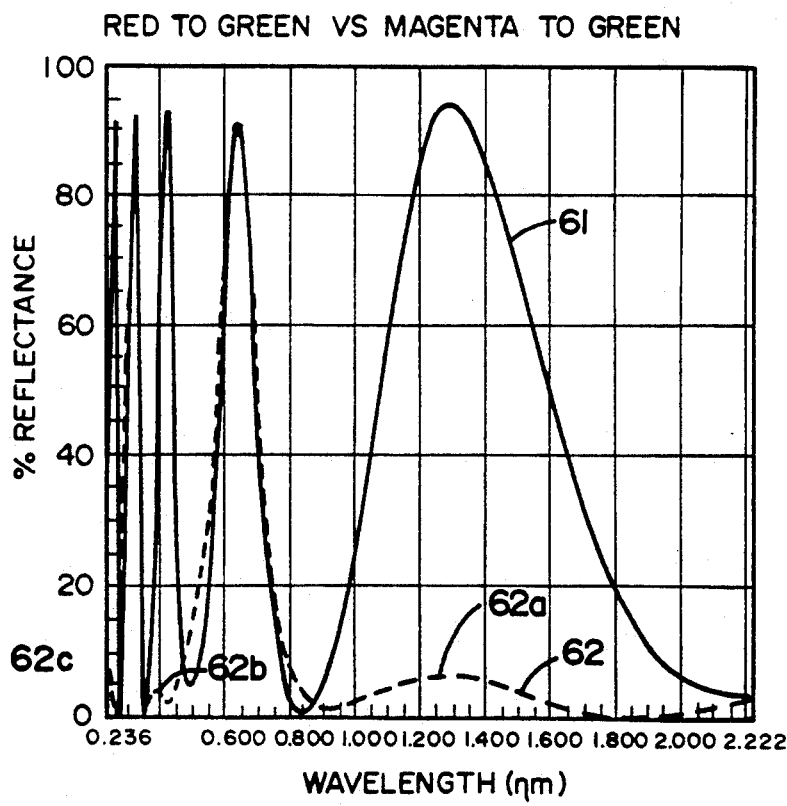
FIG. 4 is a graph showing a comparison from red to green and magenta to green optically variable interference device.

In FIG. 4 there is shown a graph which compares the red-to-green color shift which can be obtained from the two-period design shown in FIGS. 1 and 2 to that obtained from the single period design of the prior art. Thus, solid curve 61 represents a single period design with no color suppression whereas the dashed-line curve 62 represents a two-period design with alternate or periodic peak suppression. Thus it can be seen that there has been provided alternate peak suppression at 62a, 62b and 62c. The suppression is at 1.3 microns, at 0.38 microns or 380 nanometers and at 0.25 microns or 25 nanometers.

Figure 5:
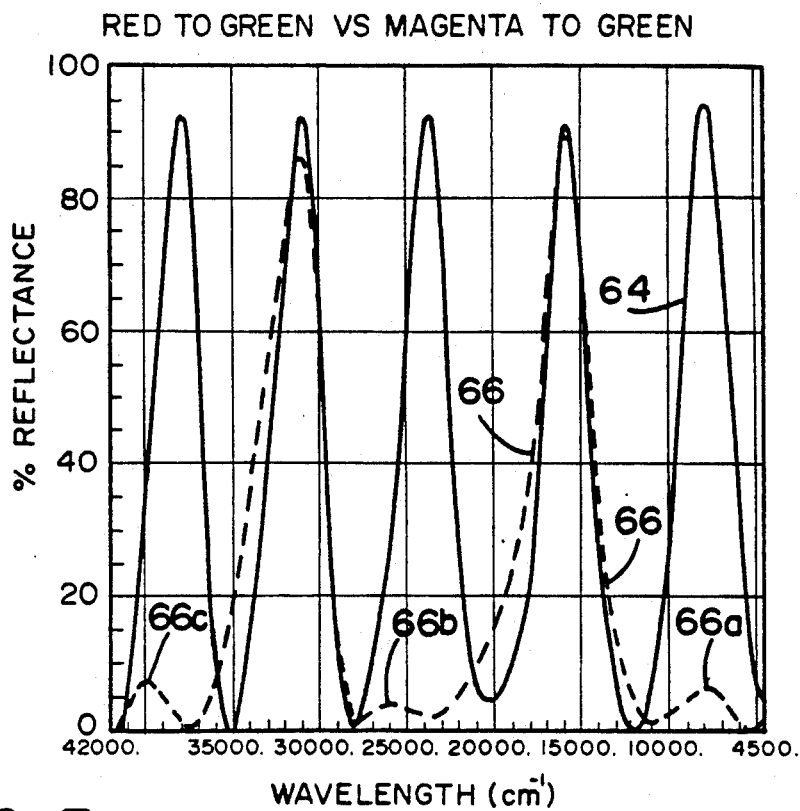
FIG. 5 is a graph similar to FIG. 3 but showing the reflectance by wave number rather than by wave length.

In FIG. 5 there is shown another graph which plots the same curves as shown in FIG. 4 but in wavenumber centimeters (cm$^{-1}$) rather than wavelength in nanometers. Among those skilled in the art wavelength is defined as 10,000 divided by the wavenumber. By plotting the reflectance curves against wavenumber as shown in FIG. 5 it can be seen that the peaks are equidistant in wave number space making it much easier to see the effect of peak suppression made in accordance with the present invention. Thus curve 64 corresponds to the curve 61 and the dashed-line curve 66 corresponds to the curve 62. Thus it can be seen in FIG. 5 that peaks are suppressed at 66a, 66b and 66c and respectively at 1.3 microns which corresponds to approximately 7690 (cm$^{-1}$). The peak is also suppressed at approximately 26,000 (cm$^{-1}$) which corresponds on the other curve 62 to the peak at approximately 380 nanometers. Still another peak is suppressed at 66c at approximately 40,000 (cm$^{-1}$) which is almost impossible to see in the curve 62 in FIG. 4 at 0.25 microns at 62c. Thus it can be seen that by depicting the reflectance in wave numbers it is much easier to see the periodic suppression of colors.

Figure 6:
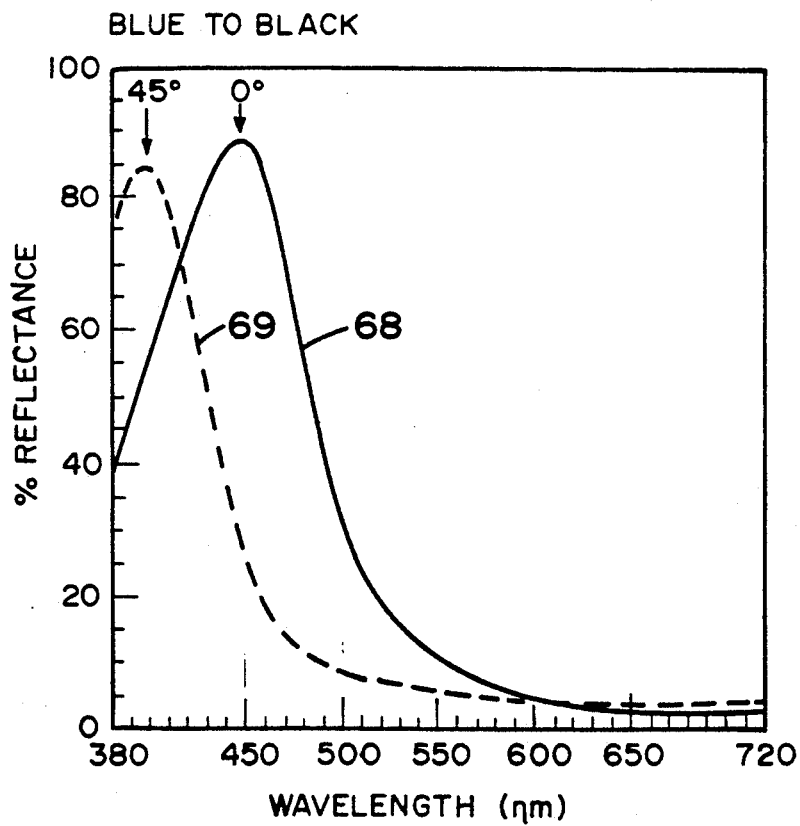
FIG. 6 is a graph showing a blue to black optically variable interference device.

FIG. 6 shows another graph which is made possible by the two-period design of the present invention which is not possible using a single period design of the prior art. A blue-to-black color shift is provided. The solid line curve 68 represents the reflected color at a normal viewing angle of 0° and the dashed-line curve 69 represents the reflected color at 45°. The reflected color at 0° is blue and the reflected color at 45° is black.

Figure 7:
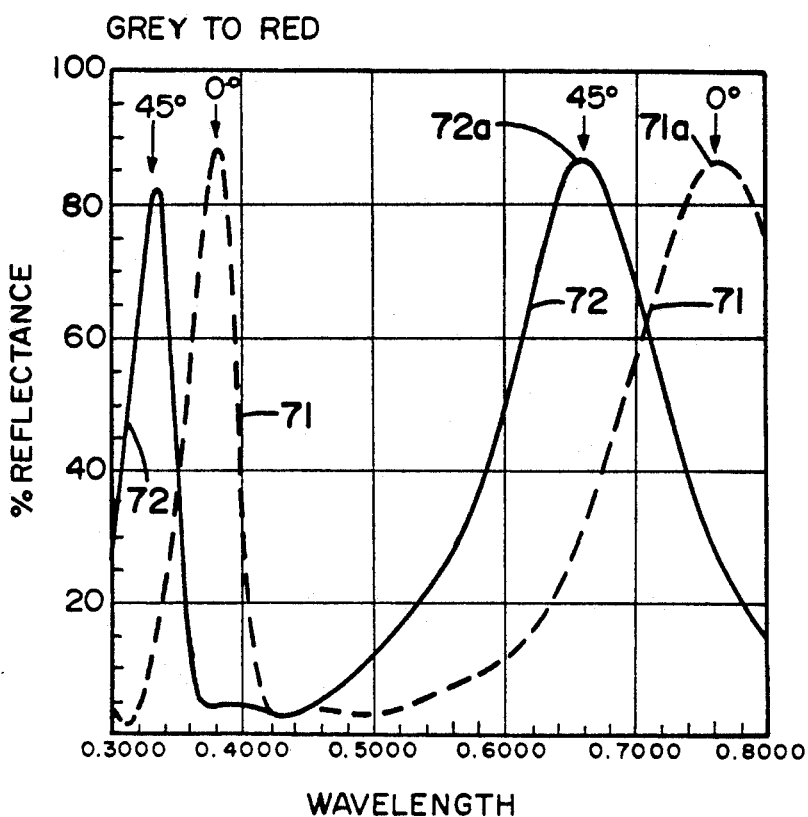
FIG. 7 is a graph showing a gray to red optically variable interference device.

FIG. 7 is a graph which shows another color shift from grey to red. The solid line curve 71 shows the reflectance at 0° and the dashed-line curve 72 shows the reflectance at 45°. The rightmost peak 71a of the 0° curve 71 at 780 nanometers shows a color grey whereas the rightmost peak 72a of the curve 72 at approximately 650 nanometers shows a color red. Thus, there is provided a color shift from a grey effect to substantially a red color in shifting from 0° to 45°.

Figure 8:
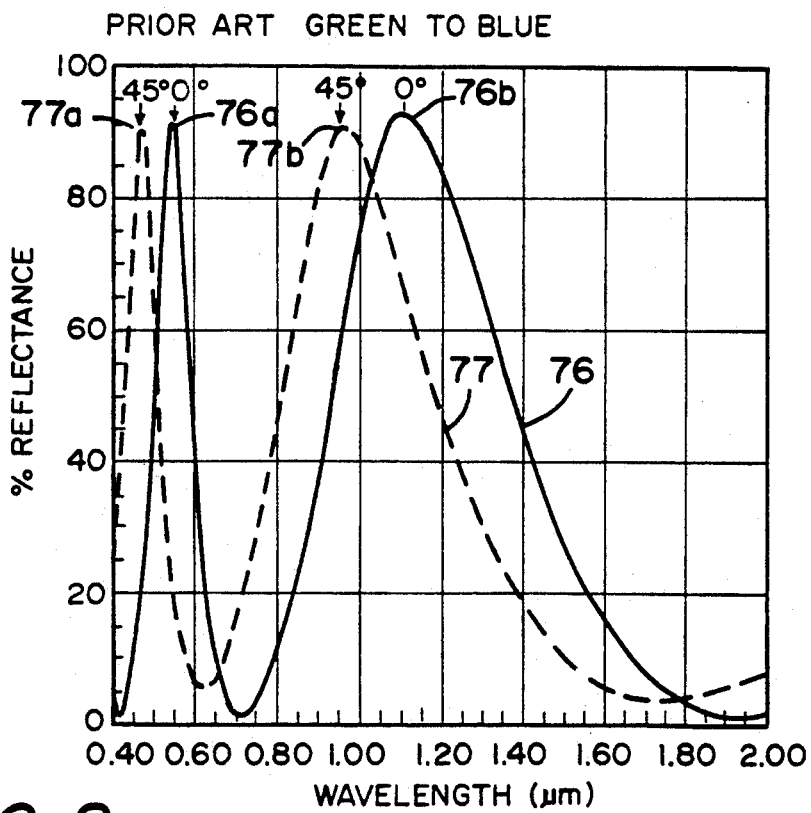
FIG. 8 is a graph showing a prior art green to blue optically variable interference device.

In FIG. 8 there is a graph showing a prior art green-to-blue color shifter using a single period design. Solid line curve 76 and a dashed-line curve 77 show the reflectance at 0° and 45° respectively. The peaks 76a and 77a of the curves 76 and 77 are in the leftmost portion of the graph which encompasses the visible spectrum at approximately 0.4 to 0.7 microns and show the green-to-blue color shift in moving from 0° to 45°. In changing the viewing angle from 0° to 45°, the peak at 1.1 microns (peak 76b) shifts to 0.95 microns (peak 77b).

Figure 9:
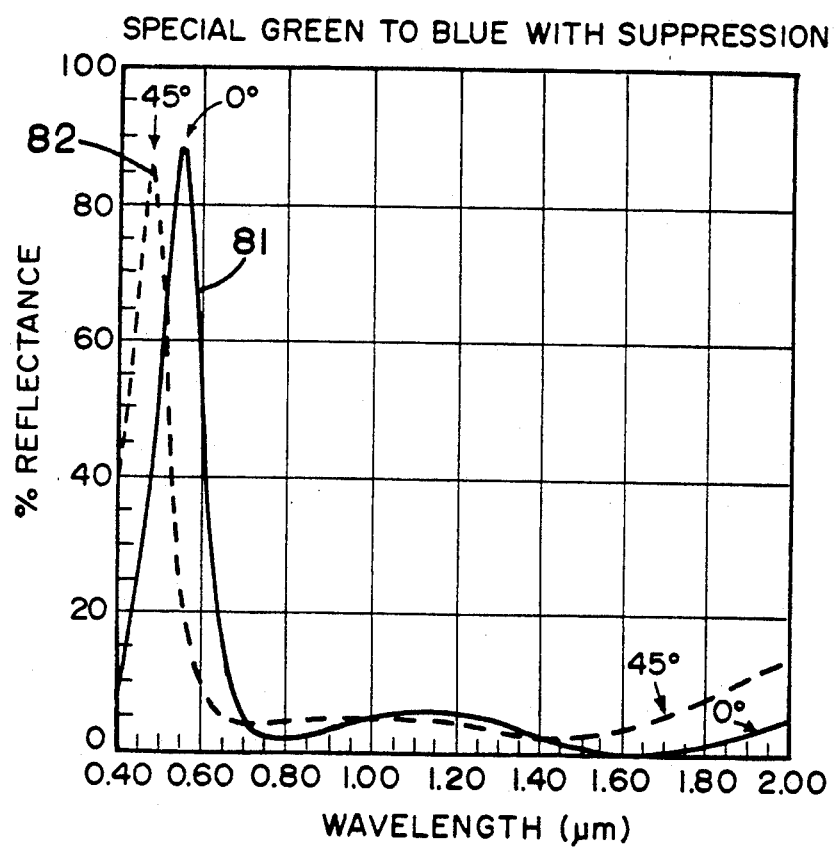
FIG. 9 is a graph showing a blue to green optically variable interference device with suppression.

FIG. 9 is a graph showing a green-to-blue color shifter utilizing the two period design of the present invention. Solid line curve 81 and dashed-line curve 82 are shown for reflections at 0° and 45° respectively. It can be seen that the peaks in the 400 to 700 nanometer region that give the blue-to-green color shift remain whereas the reflectance curve in the infrared shown in FIG. 8 have been suppressed as shown in FIG. 9 so that there is no substantial reflectance in the near infrared region.

Even though both designs shown in FIGS. 8 and 9 provide a green-to-blue color shift, the two designs can be used in conjunction with each other to provide novel effects. For example, one-half of the pattern could be provided from a single period green-to-blue shifter of the type shown in FIG. 8, whereas the other half of the pattern could be provided as a two-period green-to-blue shifter shown in FIG. 9. Under the naked human eye both shifters would appear the same, whereas if the same pattern is examined in an infrared light, the differences in the pattern provided by the two color shifters are readily apparent and would be machine readable. Thus, the pattern could be in the form of an encoded message or a simple bar code to provide additional authenticating means in the infrared region in addition to the authentication means provided by the green-to-blue shifter in the visible region.

Figure 10:
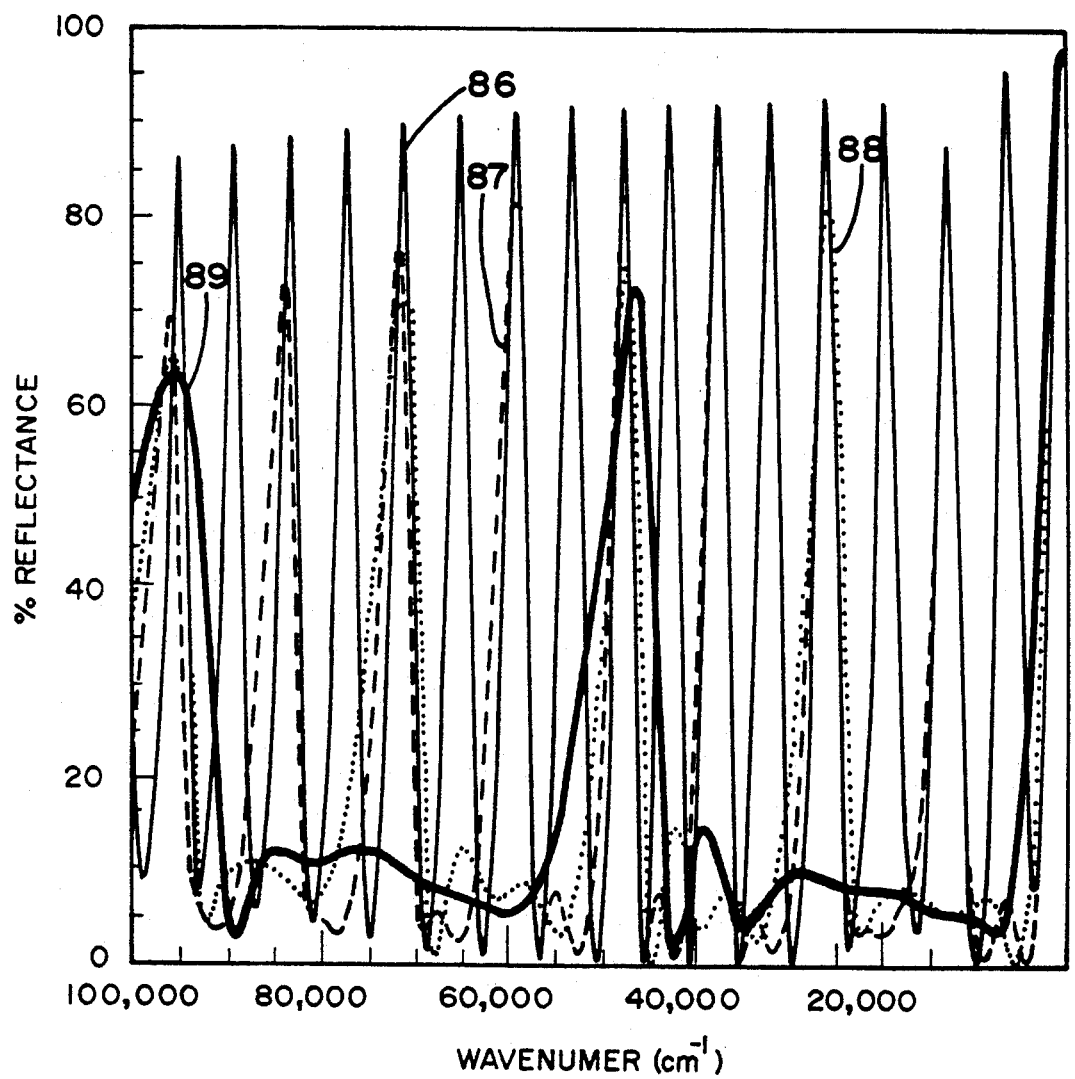
FIG. 10 is a graph showing curves for single, two, three and four period designs.

In accordance with the present invention, it has been found that additional effects are created when additional periods are utilized. Thus as it is shown in FIG. 10 curves have been given for single period through four period designs with the single period curve being identified as 86, the double or two-period curve being identified as 87. The three-period curve is identified as 88 and the four-period curve is identified as 89. The reflectance curves 86, 87, 88 and 89 are shown in wavenumbers (cm$^{-1}$). The curve 86 is in the region of 100 to 100,000 wavenumbers at 0° reflectance for a single period design with no suppression shows a total of sixteen peaks not including the rightmost peak which goes up and stays there. The curve 87 represents a double or two-period design and as can be seen suppresses every other peak so that only eight peaks remain. When three periods are utilized as shown by curve 88 it can be seen that three out of every four peaks are suppressed so that there are only four peaks. The curve 89 for the four-period design shows that seven out of every eight peaks are suppressed so that only two peaks are present in the graph shown in FIG. 9.

From the foregoing it can be seen that when two dielectric-absorber pairs are utilized, one wavelength or color is suppressed. It can be seen as additional periods are added additional colors are suppressed to provide a broader suppression range between reflectance peaks. With additional or a broader suppression range the remaining peaks have a slightly lower purity in color and the intensity may be less. By the utilization of additional periods it can be seen that additional colors can be obtained by utilizing wider suppression range. For example, black to red and black to gold color shifts should be achievable. With the present design it is possible to suppress peaks appearing in the infrared.

In examining the widths of the curves 86, 87, 88 and 89 in FIG. 10 it can be seen that the reflectance peaks become slightly wider as the number of periods are increased. Thus, a peak for a three-period design is slightly wider than a peak for the two-period design. Similarly, the four-period design has a peak with a width greater than that of a peak for a three-period design. As the peaks become wider there is a slight decrease in color purity.

It appears there is no significant advantage in providing additional periods beyond four periods. The additional periods merely decrease the color purity with added costs for depositing the additional periods.

In general it can be seen that in accordance with the present invention by utilizing two or more or multiple periods it is possible to suppress peaks in a wave form to achieve different color shifting effects other than those that can be achieved in a single period design. In addition it is possible to provide additional features which make it possible to give supplemental or additional security capabilities.

What is claimed is:

1. An optically variable interference device comprising a reflector having first and second surfaces and a thin film multilayer interference stack disposed on said first surface, said interference stack being comprised of at least two periods, each period being comprised of a metal absorber layer and a dielectric spacer layer, said metal absorber layer in one of said at least two periods being a different thickness than the metal absorber layer in the other of said at least two periods said reflector interacting with said at least two periods of said interference stack to cause peak suppression relative to a design of a single period at all angles in said design due to interference effects in the design itself of said at least two periods.

2. A device as in claim 1 wherein said reflector is formed of a substantially opaque metal.

3. A device as in claim 1 together with an additional thin film multilayer interference stack disposed on the other surface of the reflector, said additional thin film multilayer interference stack having the same number of layers and being formed of the same materials with the same thicknesses as the corresponding layers of the first named thin film multilayer interference stack.

4. A device as in claim 3 wherein said first named additional thin film multilayer interference stacks are each comprised of three periods.

5. A device as in claim 3 wherein said first named and additional thin film multilayer interference stacks are each comprised of four periods.

6. A device as in claim 1 wherein said thin film multilayer interference stack has a design that suppresses a peak in the visible region of the spectrum.

7. A device as in claim 1 wherein said thin film multilayer interference stack has a design which suppresses more than one peak in the visible region of the spectrum.

8. A device as in claim 1 wherein said metal absorber layers have a thickness ranging from 20 Å to 150 Å.

9. A device as in claim 1 together with a substrate and wherein said device has a surface secured to said substrate.

10. A device as in claim 1 together with a thin film multilayer interference stack disposed on said second surface which is the same as the thin film multilayer interference stack disposed on the first surface.

11. A device as in claim 1 wherein said thin film multilayer interference stack has a design peak suppression that suppresses at least one peak in the ultraviolet region of the spectrum relative to the design of a single period.

12. A device as in claim 1 wherein said thin film multilayer interference stack has a design peak suppression that suppresses at least one peak in the infrared region of the spectrum relative to the design of a single period.

13. An optically variable interference device having a design peak suppression, a reflector having first and second surfaces and a thin film multilayer interference stack disposed on said first surface, said interference stack being comprised of at least two periods, each period being comprised of a metal absorber layer and a dielectric spacer layer, said metal absorber layer in one of said at least two periods being a different thickness than the metal absorber layer in the other of said at least two periods said reflector interacting with said at least two periods of said interference stack to cause peak suppression at all angles in said design due to interference effects, said reflector being semi-transparent.

14. An optically variable interference device having a design peak suppression, a reflector having first and second surfaces and a thin film multilayer interference stack disposed on said first surface, said interference stack being comprised of at least two periods, each period being comprised of a metal absorber layer and a dielectric spacer layer, said reflector interacting with said at least two periods of said interference stack to cause peak suppression at all angles in said design due to interference effects, said thin film multilayer interference stack suppressing at least one peak in infrared region of the spectrum.

15. An optically variable interference device having a design peak suppression, a reflector having first and second surfaces and a thin film multilayer interference stack disposed on said first surface, said interference stack being comprised of at least two periods, each period being comprised of a metal absorber layer and a dielectric spacer layer, said reflector interacting with said at least two periods of said interference stack to cause peak suppression at all angles in said design due to interference effects, said dielectric layer having an optical thickness of approximately two quarterwaves at a design wavelength in the range of 400 to 1500 nanometers.

16. A method for providing an optically variable interference device having peak suppression in its design as compared to a design of a single period by utilizing a thin film multilayer interference stack disposed on a surface of a reflector, comprising the step of depositing an interference stack having two or more periods on the surface of the reflector with each period being comprised of a dielectric spacer layer and a metal absorber layer by depositing the metal absorber layers so that the metal absorber layer in at least one of the periods is of a thickness which is different than the thickness of the metal absorber layer in another of said periods to interact with the reflector to suppress by an interference effect solely within its design at least one peak in the design.

17. A method as in claim 16 together with the step of providing additional periods to suppress additional peaks relative to a design of a single or a double period by interference effects solely within its design.

18. A method for providing an optically variable interference device having peak suppression by utilizing a thin film multilayer interference stack disposed on the surface of a reflector comprising the step of providing an interference stack having two or more periods with each period being comprised of a dielectric spacer layer and a metal absorber layer to interact with the reflector to suppress at least one color, said dielectric spacer layer in each period of a two period design being formed of the same materials and approximately the same thickness said absorber layer of one period being of the same material and approximately one-third to one-half of the thickness of the absorber layer of the other period.

19. In a method for creating an optically variable interference effect in a design utilizing a reflector having first and second surfaces, creating interference effects from a thin film multilayer interference stack comprised of at least two periods with each period being comprised of a dielectric spacer layer and a metal absorber layer with the metal absorber layer in one period being of a different thickness than the metal absorber layer in another period to interact with the first surface of the reflector to suppress by an interference effect solely within its design at least one reflectance peak relative to a design of a single period.

20. A method as in claim 19 together with the step of creating interference effects to interact with the second surface of the reflector which are the same as those which interact with the first surface.

21. An optically variable interference device having a design peak suppression, a reflector having first and second surfaces and a thin film multilayer interference stack disposed on said first surface, said interference stack being comprised of at least two periods, each period being comprised of a metal absorber layer and a dielectric spacer layer, said reflector interacting with said at least two periods of said interference stack to cause peak suppression at all angles in the design due to interference effects, said interference stack being comprised of two periods, said dielectric layers in said two periods being formed of the same materials and being of the same thicknesses, said absorber layers of said two periods being formed of the same materials with one absorber layer having a thickness of from one-third to one-half of the thickness of the other absorber layer.

22. A device as in claim 21 wherein said thin film multilayer interference stack has a design peak suppression that suppresses at least one peak in the ultraviolet region relative to the design of a single period.

23. A device as in claim 21 wherein said thin film multilayer interference stack has a design peak suppression that suppresses at least one peak in the infrared region relative to the design of a single period.

24. In an optically variable device, a reflector having first and second surfaces, a thin film multilayer interference stack comprised of a single period disposed on a portion of said first surface and an additional thin film multilayer interference stack comprised of at least two periods disposed on another portion of said first surface, each period of said additional thin film multilayer interference stacks being comprised of a metal absorber layer and a dielectric spacer layer, said metal absorber layers of said at least two periods being of different thicknesses, said reflector interacting with said at least two periods of said additional thin film multilayer interference stack to cause peak suppression due to interference effects.

25. A device as in claim 24 wherein said first named and additional thin film multilayer interference stacks are also disposed on said second surface.

26. A device as in claim 24 wherein the peak suppressed by the additional thin film multilayer interference stack is disposed in the ultraviolet region.

27. In an optically variable device, a reflector having first and second surfaces, a thin film multilayer interference stack comprised of a single period disposed on a portion of said first surface and an additional thin film multilayer interference stack comprised of at least two periods disposed on another portion of said first surface, each period of said additional thin film multilayer interference stacks being comprised of a metal absorber layer and a dielectric spacer layer, said reflector interacting with said at least two periods of said additional thin film multilayer interference stack to cause peak suppression due to interference effects, the peak suppressed by the additional thin film multilayer interference stack being disposed in the infrared region.

28. A method for providing an optically variable interference device on a first surface of a reflector having first and second surfaces comprising the steps of providing a color shift with a thin film multilayer interference stack having a single period on a portion of said first surface and providing the same color shift with an additional thin film multilayer interference stack having two or more periods which has a suppressed peak on another portion of said at least one surface, the suppressed peak being disposed in the infrared region to provide a covert feature.

29. A method for providing an optically variable interference device on a surface of a reflector comprising the steps of providing a color shift with a multilayer interference stack having a single period on a portion of said surface and providing the same color shift with an additional multilayer interference stack on another portion of said surface, said additional multilayer interference stack having two or more periods which suppresses a peak in the ultraviolet region relative to the design of a single period.

30. A method for providing an optically variable interference device on the first surface of the reflector having first and second surfaces comprising the steps of providing a color shift with a thin film multilayer interference stack having a single period on a portion of said surface and providing the same color shift in an additional thin film multilayer interference stack having two or more periods on another portion of said at least one surface, said additional thin film multilayer interference stack suppressing a peak in the ultraviolet region relative to the design of a single period to provide a covert feature.

31. A method for providing an optically variable interference device on a first surface of a reflector having first and second surfaces comprising the steps of providing a color shift with a thin film multilayer interference stack having a single period on a portion of said first surface and providing the same color shift with an additional thin film multilayer interference stack having two or more periods which has a suppressed peak on another portion of said at least one surface, said additional interference stack being comprised of two periods, with dielectric layers in said two periods being formed of the same materials and being of the same thicknesses, and absorber layers of said two periods being formed of the same materials with one absorber layer having a thickness of from one-third to one-half of the thickness of the other absorber layer.

* * * * *